(12) United States Patent
Moll et al.

(10) Patent No.: US 7,313,146 B2
(45) Date of Patent: Dec. 25, 2007

(54) TRANSPARENT DATA FORMAT WITHIN HOST DEVICE SUPPORTING DIFFERING TRANSACTION TYPES

(75) Inventors: Laurent R. Moll, Saratoga, CA (US); Manu Gulati, San Francisco, CA (US); Joseph B. Rowlands, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 996 days.

(21) Appl. No.: 10/684,989

(22) Filed: Oct. 14, 2003

(65) Prior Publication Data

US 2004/0151175 A1    Aug. 5, 2004

Related U.S. Application Data

(63) Continuation-in-part of application No. 10/356,661, filed on Jan. 31, 2003.

(51) Int. Cl.
*H04L 12/56* (2006.01)
(52) U.S. Cl. .................. 370/413; 370/423; 710/20
(58) Field of Classification Search ............... 370/389, 370/369, 412, 413, 423; 710/5–7, 20
See application file for complete search history.

(56) References Cited

U.S. PATENT DOCUMENTS 7,088,713 B2 *    8/2006    Battle et al. ................ 370/389

* cited by examiner

*Primary Examiner*—John Pezzlo
(74) *Attorney, Agent, or Firm*—Garlick Harrison & Markison; Bruce E. Garlick

(57) ABSTRACT

A system for servicing packet data transactions and input/output transactions includes an input port, an output port, a node controller, a packet manager, and a switching module. The input port is receives communications from a communicatively coupled processing device that include packet data transactions and input/output transactions. The output port transmits communications to a communicatively coupled processing device that include packet data transactions and input/output transactions. The node controller communicatively couples to a system bus of the processing device and services input/output transactions. The packet manager communicatively couples to the system bus of the processing device and services packet data transactions. A switching module communicatively couples to the input port, the output port, the node controller, and the packet manager and services the exchange of transaction cells among the input port, the output port, the node controller, and the packet manager. Each transaction cell has a control tag and data and carrying all or a portion of a packet data transaction or an input/output transaction.

31 Claims, 13 Drawing Sheets processing system 10 processing device 20 processing system 20

| SRC_AGT_A STATUS | DST_AGT_A STATUS | OVC_1 | EOP_ST |
|---|---|---|---|
| SRC_AGT_A STATUS | DST_AGT_A STATUS | OVC_2 | EOP_ST |
| SRC_AGT_A STATUS | DST_AGT_A STATUS | OVC_3 | EOP_ST |
| • | • | • | • |
| SRC_AGT_A STATUS | DST_AGT_A STATUS | OVC_N | EOP_ST |
| SRC_AGT_A STATUS | DST_AGT_B STATUS | OVC_1 | EOP_ST |
| SRC_AGT_A STATUS | DST_AGT_B STATUS | OVC_2 | EOP_ST |
| SRC_AGT_A STATUS | DST_AGT_B STATUS | OCV_3 | EOP_ST |
| • | • | • | • |
| • | • | • | • |
| • | • | • | • |
| • | • | • | • |
| • | • | • | • |
| • | • | • | • |
| SRC_AGT_D STATUS | DST_AGT_D STATUS | OVC_N-2 | EOP_ST |
| SRC_AGT_D STATUS | DST_AGT_D STATUS | OVC_N-1 | EOP_ST |
| SRC_AGT_D STATUS | DST_AGT_D STATUS | OVC_N | EOP_ST |

Agent Status Information Table - 31

FIG. 5

| CONTROL TAG (4 BYTES) |
|---|
| DATA (16 BYTES) |

Transaction Cell - 402

FIG. 4

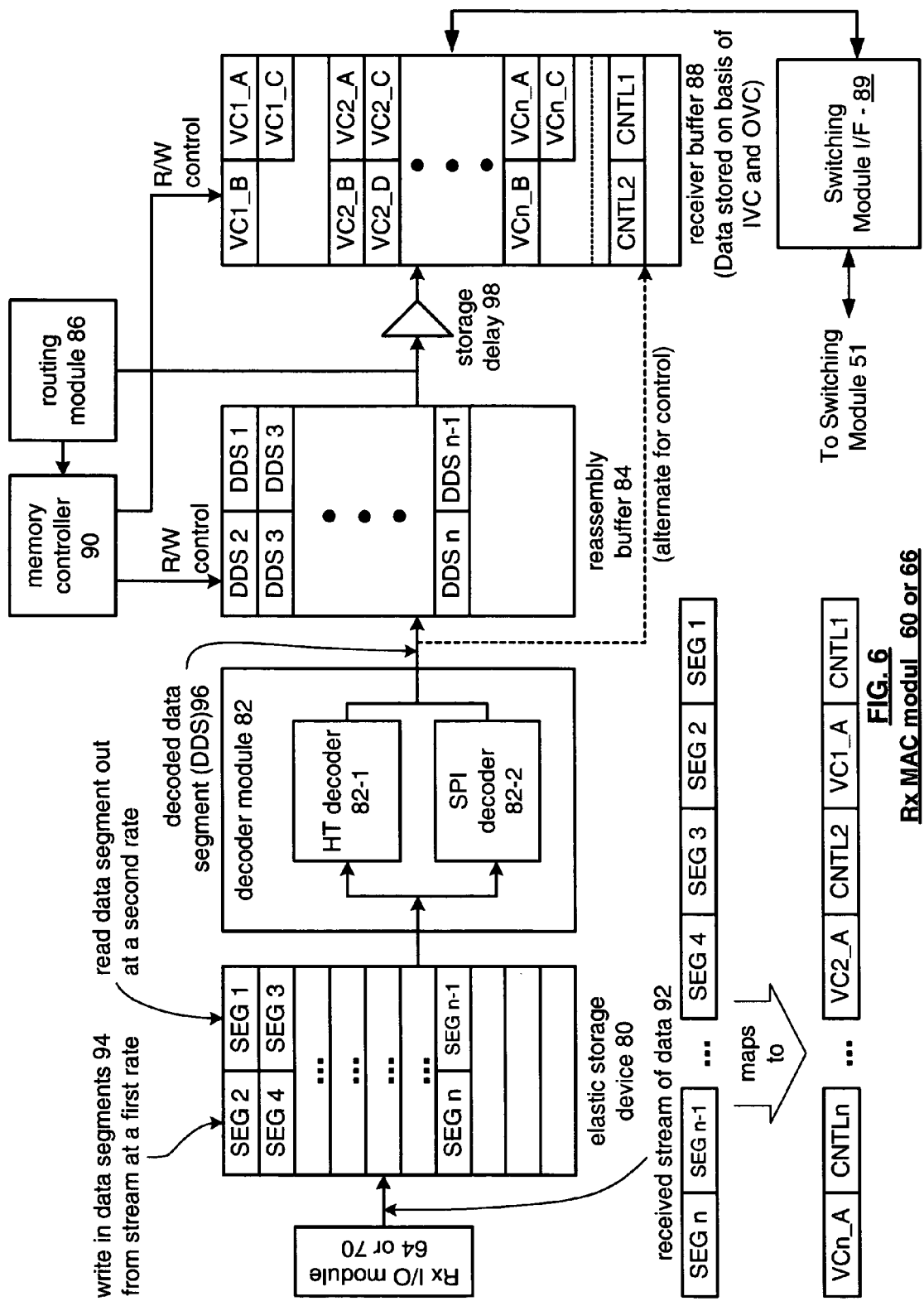

Switch Interface Signals

| Agent | Group | Signal | Description |
|---|---|---|---|
| Source Agent | Request | xxx_sreq_agent_sw[2:0] | Destination agent for which data is available |
| | | xxx_sreq_type_sw | Type of data |
| | | xxx_sreq_vc_sw[4:0] | Destination VC for which data is available |
| | | xxx_sreq_eop_sw | EOP for that data |
| | | xxx_sreq_valid_sw | Previous fields are valid |
| | Grant | sw_sgnt_agent_xxx[2:0] | Destination agent to which data should be sent |
| | | sw_sgnt_type_xxx | Type of data |
| | | sw_sgnt_vc_xxx[4:0] | Destination VC for which data should be sent |
| | | sw_sgnt_valid_xxx | Previous fields are valid |
| | Reload | xxx_sreload_eop_sw | EOP of the reloaded destination/VC |
| | | xxx_sreload_valid_sw | There is more data on the destination/VC that just got scheduled |
| | Data | xxx_sdata_bits_sw[127:0] | Payload (16B) |
| | | xxx_sdata_count_sw[3:0] | Count |
| | | xxx_sdata_tag_sw[27:0] | Tag |

FIG. 9

Switch Interface Signals

| Agent | Group | Signal | Description |
|---|---|---|---|
| Dest. Agent | Request | yyy_dreq_type_sw | Type of data |
| | | yyy_dreq_vc_sw[4:0] | VC for which space is available |
| | | yyy_dreq_valid_sw | Previous field is valid |
| | Grant | sw_dgnt_agent_yyy[2:0] | Source agent which will send data |
| | | sw_dgnt_type_yyy | Type of data |
| | | sw_dgnt_vc_yyy[4:0] | VC to which data will be sent |
| | | sw_dgnt_eop_yyy | EOP of the data to be sent |
| | | sw_dgnt_valid_yyy | Previous fields are valid |
| | Reload | yyy_dreload_valid_sw | There is more space on the VC that just got scheduled |
| | Data | sw_ddata_bits_yyy[127:0] | Payload (16B) |
| | | sw_ddata_count_yyy[3:0] | Data count |
| | | sw_ddata_tag_yyy[27:0] | Tag |
| | Reset | Reset yyy_dreset_state_sw | State of the credits after reset |

FIG. 10

TRANSPARENT DATA FORMAT WITHIN HOST DEVICE SUPPORTING DIFFERING TRANSACTION TYPES

CROSS REFERENCES TO RELATED APPLICATIONS

The present application is a continuation-in-part of and claims priority under 35 U.S.C. 120 to the following application, which is incorporated herein for all purposes:

(1) U.S. Regular Utility Application entitled PACKET DATA SERVICE OVER HYPERTRANSPORT LINK(S), having an application Ser. No. 10/356,661, and a filing date of Jan. 31, 2003.

BACKGROUND OF THE INVENTION

1. Technical Field

The present invention relates generally to data communications and more particularly to the management and processing of high-speed data communications within a processing device.

2. Description of Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), SPI (system packet interface), among others. One relatively new communication technology for coupling relatively small groups of devices is the HyperTransport (HT) technology, previously known as the Lightning Data Transport (LDT) technology (HyperTransport I/O Link Specification "HT Standard"). One or more of these standards set forth definitions for a high-speed, low-latency protocol that can interface with today's buses like AGP, PCI, SPI, 1394, USB 2.0, and 1 Gbit Ethernet, as well as next generation buses, including AGP 8x, Infiniband, PCI Express, PCI-X, PCI 3.0, and 10 Gbit Ethernet. A selected interconnecting standard provides high-speed data links between coupled devices. Most interconnected devices include at least a pair of input/output ports so that the enabled devices may be daisy-chained. In an interconnecting fabric, each coupled device may communicate with each other coupled device using appropriate addressing and control. Examples of devices that may be chained include packet data routers, server computers, data storage devices, and other computer peripheral devices, among others. Devices that are coupled via the HT standard or other standards are referred to as being coupled by a "peripheral bus."

Of these devices that may be chained together via a peripheral bus, many require significant processing capability and significant memory capacity. Thus, these devices typically include multiple processors and have a large amount of memory. While a device or group of devices having a large amount of memory and significant processing resources may be capable of performing a large number of tasks, significant operational difficulties exist in coordinating the operation of multiple processors. While each processor may be capable of executing a large number of operations in a given time period, the operation of the processors must be coordinated and memory must be managed to assure coherency of cached copies. In a typical multi-processor installation, each processor typically includes a Level 1 (L1) cache coupled to a group of processors via a processor bus. The processor bus is most likely contained upon a printed circuit board. A Level 2 (L2) cache and a memory controller (that also couples to memory) also typically couples to the processor bus. Thus, each of the processors has access to the shared L2 cache and the memory controller and can snoop the processor bus for its cache coherency purposes. This multi-processor installation (node) is generally accepted and functions well in many environments.

However, network switches and web servers often times require more processing and storage capacity than can be provided by a single small group of processors sharing a processor bus. Thus, in some installations, a plurality of processor/memory groups (nodes) is sometimes contained in a single device. In these instances, the nodes may be rack mounted and may be coupled via a back plane of the rack. Unfortunately, while the sharing of memory by processors within a single node is a fairly straightforward task, the sharing of memory between nodes is a daunting task. Memory accesses between nodes are slow and severely degrade the performance of the installation. Many other shortcomings in the operation of multiple node systems also exist. These shortcomings relate to cache coherency operations, interrupt service operations, etc.

While peripheral bus interconnections provide high-speed connectivity for the serviced devices, servicing a peripheral bus interconnection requires significant processing and storage resources. A serviced device typically includes a plurality of peripheral bus ports, each of which has a receive port and a transmit port. The receive port receives incoming data at a high speed. This incoming data may have been transmitted from a variety of source devices with data coming from the variety of source devices being interleaved and out of order. The receive port must organize and order the incoming data prior to forwarding the data to a destination resource within the serviced device or to a transmit port that couples to the peripheral bus fabric. The process of receiving, storing, organizing, and processing the incoming data is a daunting one that requires significant memory for data buffering and significant resources for processing the data to organize it and to determine an intended destination. Efficient structures and processes are required to streamline and hasten the storage and processing of incoming data so that it may be quickly forwarded to its intended destination within or outside of the servicing device.

BRIEF SUMMARY OF THE INVENTION

A system for servicing packet data transactions and input/output transactions within a processing device using common data paths overcomes the above-described shortcomings, among others. The system includes an input port, an output port, a node controller, a packet manager, and a switching module. The input port is operable to receive communications from a communicatively coupled processing device, the communications including packet data transactions and input/output transactions. The output port is operable to transmit communications to a communicatively coupled processing device, the communications including packet data transactions and input/output transactions. The node controller communicatively couples to a system bus of the processing device and is operable to service input/output transactions. The packet manager communicatively couples to the system bus of the processing device and is operable to service packet data transactions. A switching module communicatively couples to the input port, the output port, the node controller, and the packet manager. The switching module is operable to service the exchange of transaction cells among the input port, the output port, the node controller, and the packet manager, each transaction cell having a control tag and data and carrying all or a portion of a packet data transaction or an input/output transaction.

The system may further include an agent status information table that is used by the switching module to schedule the exchange of transaction cells among the input port, the output port, the node controller, and the packet manager. With the system, the input port and/or the output port can support both a packet-based interface and an input/output-based interface. The packet based interface may be a SPI-4 interface while the input/output based interface may be an HyperTransport interface, PCI interface, PCI Express Interface, or a PCI-X interface, among others. Input/output transactions may be read transactions, write transactions, and cache coherency transactions. Packet data transactions may include packet data transfers between the processing device and another processing device coupled to the processing device via the input port and/or the output port.

The transaction cells are formed such that the control tag includes a first set of information when the transaction cell corresponds to a packet data transaction and a second set of information when the transaction cell corresponds to an input/output transaction. When a transaction cell carries a packet data transaction the control tag may include a transaction cell data bit count, an input virtual channel identifier, and a packet data source identifier. When a transaction cell carries an input/output transaction the control tag may include a first set of information when the transaction cell corresponds to non-response input/output transaction and a second set of information when the transaction cell corresponds to a response input/output transaction. The first set of information may include a command bit and a flush bit and the second set of information may include a command bit, information concerning forwarding of the input/output transaction, and a flush bit.

Further, the transaction cells may be formed differently when carrying different types of input/output transactions. For example, when the input/output transaction is a response, a control tag of a first transaction cell may carry a control portion of the input/output transaction and data of the first transaction cell may carries a data portion of the input/output transaction. Further, when the input/output transaction is not a response, data of a first transaction cell may carry a control portion of the input/output transaction and data of a second transaction cell may carry a data portion of the input/output transaction.

Other features and advantages of the present invention will become apparent from the following detailed description of the invention made with reference to the accompanying drawings.

BRIEF DESCRIPTION OF THE SEVERAL VIEWS OF THE DRAWINGS

FIG. 4 is diagram illustrating a transaction cell constructed according to one embodiment of the present invention that is used to forward data within the multiple processor device of FIG. 2;

FIG. 5 is a diagram illustrating an agent status information table constructed according to an embodiment of the present invention that is used to schedule the forwarding of transaction cells within the multiple processor device of FIG. 2;

FIG. 6 is a schematic block diagram of a receiver media access control module in accordance with the present invention;

FIGS. 9 and 10 are tables illustrating switch interface signals employed by the switching module and a plurality of serviced agents;

DETAILED DESCRIPTION OF THE INVENTION

Figure 1:
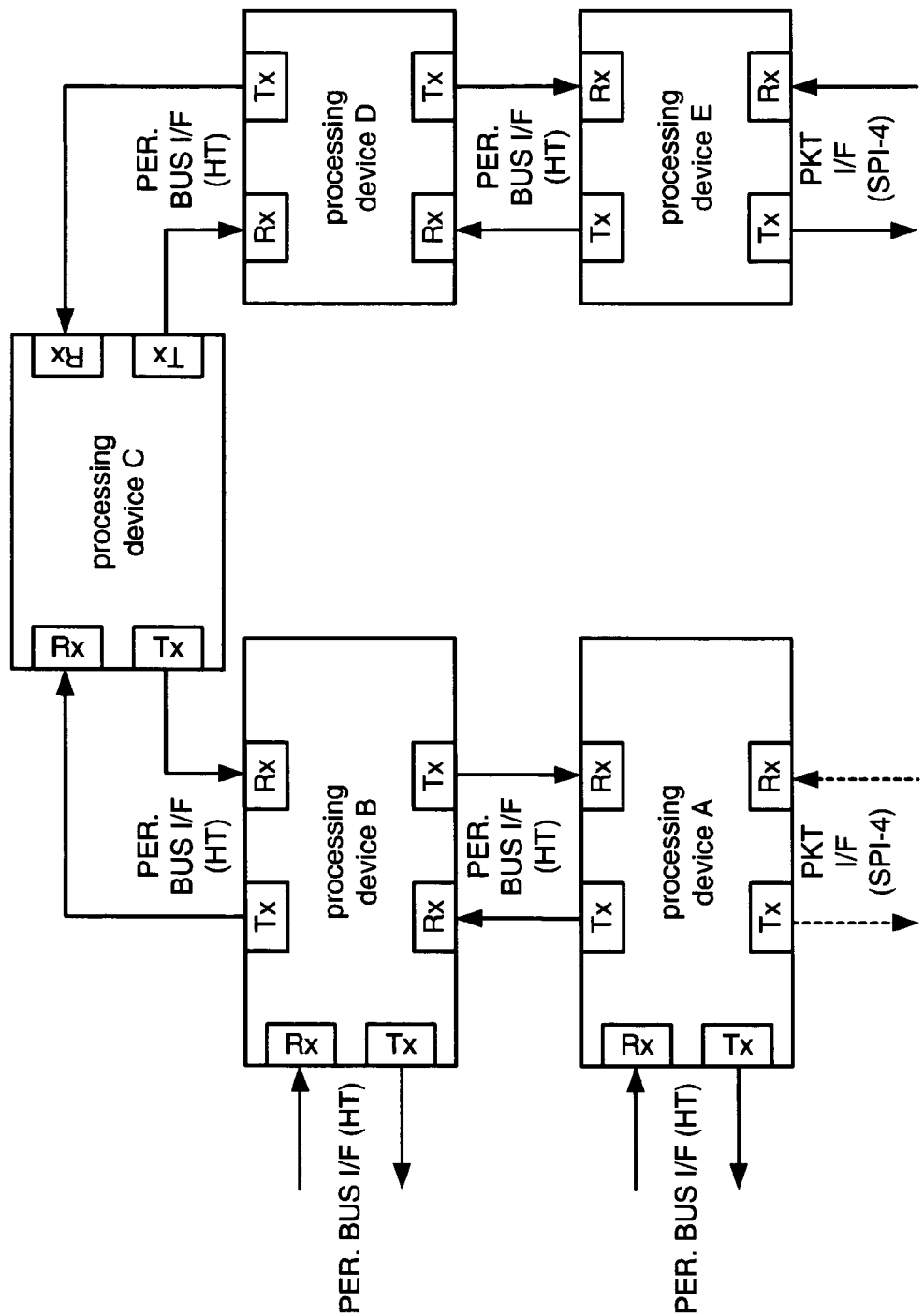
FIG. 1 is a schematic block diagram of a processing system in accordance with the present invention.

FIG. 1 is a schematic block diagram of a processing system 10 that includes a plurality of processing devices A-E. Each of the processing devices A-E includes at least two interfaces, each of which includes a Transmit (Tx) port and a Receive (Rx) port. The details of the processing devices A-E will be described with reference to FIGS. 2 and 3. The processing devices A-E share resources in some operations. Such resource sharing may include the sharing of processing functions, the sharing of memory, and the sharing of other resources that the processing devices may perform or possess. The processing devices are coupled by a peripheral bus fabric, which may operate according to the HyperTransport (HT) standard, the PCI standard, the PCI-Express standard, or the PCI-X standard, among others. Thus, each processing device has at least two configurable interfaces, each having a transmit port and a receive port. In this fashion, the processing devices A-E may be coupled via a peripheral bus fabric to support resource sharing. Some of the devices may have more than two configurable interfaces to support coupling to more than two other devices. Further, the configurable interfaces may also support a packet-based interface, such as a SPI-4 interface, such as is shown in FIG. 1.

Figure 2:
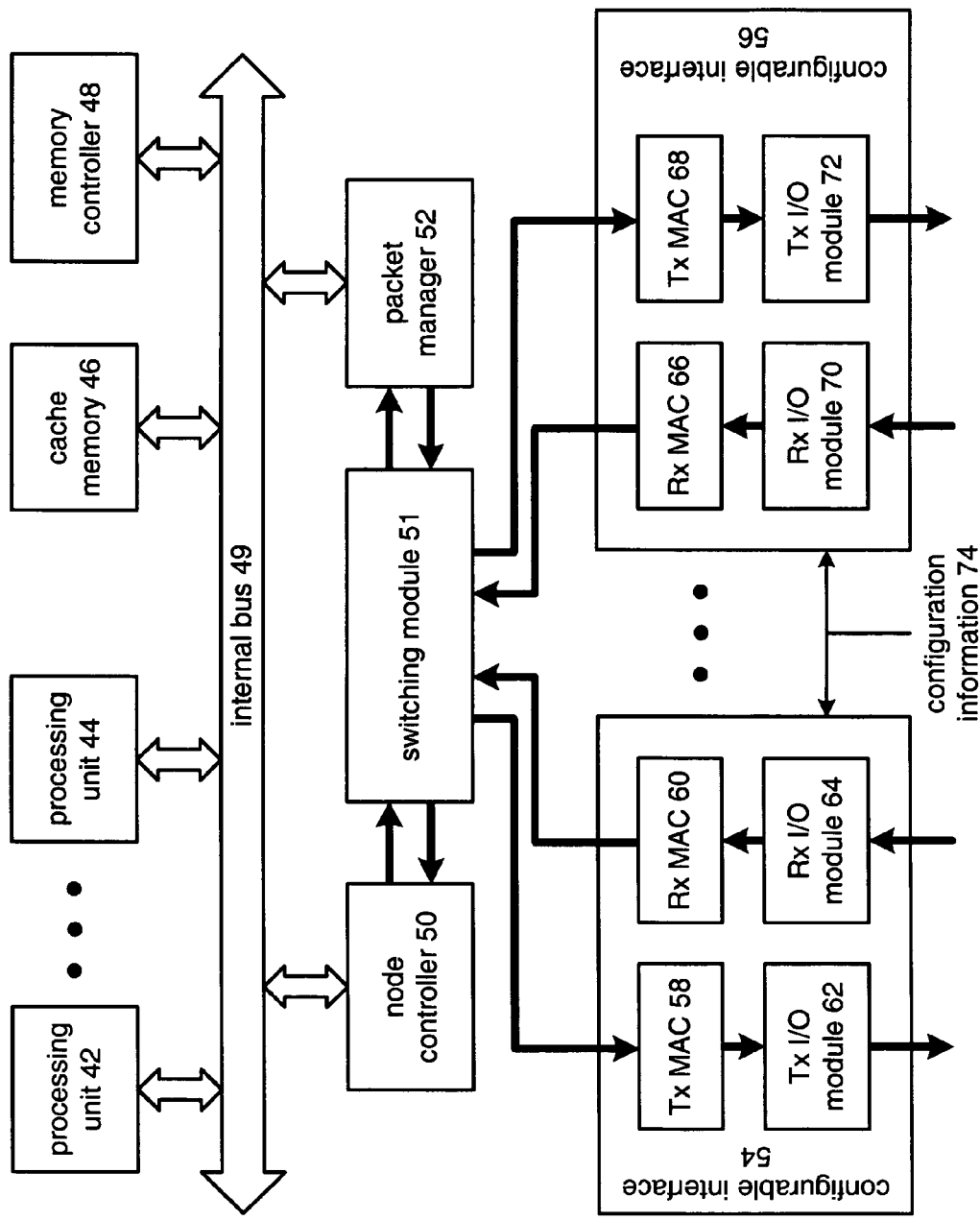
FIG. 2 is a schematic block diagram of a multiple processor device in accordance with the present invention.

FIG. 2 is a schematic block diagram of a multiple processor device 20 in accordance with the present invention.

The multiple processor device 20 may be an integrated circuit or it may be constructed from discrete components. In either implementation, the multiple processor device 20 may be used as a processing device A-E in the processing system 10 illustrated in FIG. 1. The multiple processor device 20 includes a plurality of processing units 42-44, a cache memory 46, a memory controller 48, which interfaces with on and/or off-chip system memory, an internal bus 49, a node controller 50, a switching module 51, a packet manager 52, and a plurality of configurable packet based interfaces 54-56 (only two shown). The processing units 42-44, which may be two or more in numbers, may have a MIPS based architecture, may support floating point processing, and may support branch prediction, and may take any structure that supports processing operations. In addition, each processing unit 42-44 may include a memory sub-system of an instruction cache and a data cache and may support separately, or in combination, one or more processing functions.

The internal bus 49, which may be a 256-bit cache line wide split transaction cache coherent bus, couples the processing units 42-44, cache memory 46, memory controller 48, node controller 50 and packet manager 52, together. The cache memory 46 may function as an L2 cache for the processing units 42-44, node controller 50, and/or packet manager 52. With respect to the processing system of FIG. 1, the cache memory 46 may be a destination within multiple processor device 20.

The memory controller 48 provides an interface to system memory, which, when the multiple processor device 20 is an integrated circuit, may be off-chip and/or on-chip. With respect to the processing system of FIG. 1, the system memory may be a destination within the multiple processor device 20 and/or memory locations within the system memory may be individual destinations within the multiple processor device 20. Accordingly, the system memory may include one or more destinations for the processing systems illustrated in FIG. 1.

The node controller 50 functions as a bridge between the internal bus 49 and the configurable interfaces 54-56. Accordingly, accesses originated on either side of the node controller will be translated and sent on to the other. The node controller may support a distributed shared memory model associated with cache coherency non-uniform memory access (CC-NUMA) protocol.

The switching module 51 couples the plurality of configurable interfaces 54-56 to one another, to the node controller 50, and/or to the packet manager 52. The switching module 51 functions to direct data traffic, which is formed in a generic format, between the node controller 50 and the configurable interfaces 54-56 and between the packet manager 52 and the configurable interfaces 54-56. This generic data format, referred to herein as a "transaction cell," may include 8-byte data words or 16-byte data words formatted in accordance with a proprietary protocol, in accordance with asynchronous transfer mode (ATM) cells, in accordance with Internet protocol (IP) packets, in accordance with transmission control protocol/Internet protocol (TCP/IP) packets, and/or in general, in accordance with any packet-switched protocol or circuit-switched protocol. Transaction cells will be described in detail with reference to FIGS. 3, 4, 5, and 8-14.

The packet manager 52 may be a direct memory access (DMA) engine that writes packets received from the switching module 51 into input queues of the system memory and reads packets from output queues of the system memory to the appropriate configurable interface 54-56. The packet manager 52 may include an input packet manager and an output packet manager each having its own DMA engine and associated cache memory. The cache memory may be arranged as first-in-first-out (FIFO) buffers that respectively support the input queues and output queues.

The configurable interfaces 54-56 generally function to convert data between a high-speed communication protocol (e.g., HT, SPI, PCI, PCI Express, PCI-X, etc.) and the generic data format employed within the multiple processor device 20, i.e., transaction cells. Accordingly, the configurable interface 54 or 56 converts incoming peripheral bus transactions to transaction cells that are passed to the switching module 51 for processing within the multiple processor device 20. In addition, the configurable interfaces 54 and/or 56 convert transaction cells received from the switching module 51 into HT packets, SPI packets, or other format for output from the processing device 20. The particular conversion of packets to transaction cells performed by the configurable interfaces 54-56 is based on configuration information 74, which, for example, indicates configuration for HT to generic format conversion or SPI to generic format conversion.

Each of the configurable interfaces 54-56 includes a transmit media access control (Tx MAC) module 58 or 68, a receive (Rx) MAC module 60 or 66, a transmit input/output (I/O) module 62 or 72, and a receive input/output (I/O) module 64 or 70. The transmit I/O module 62 or 72 generally functions to drive the high-speed formatted stream of data onto a physical link coupling the present multiple processor device 20 to another device. The transmit I/O module 62 or 72 is further described, and incorporated herein by reference, in co-pending patent application entitled, MULTI-FUNCTION INTERFACE AND APPLICATIONS THEREOF, Ser. No. 10/305,648, and having been filed on Nov. 27, 2002. The receive I/O module 64 or 70 generally functions to amplify and time align the high-speed formatted steam of data received via a physical link coupling the multiple processor device 20 to another multiple processor device. The receive I/O module 64 or 70 is further described, and incorporated herein by reference, in co-pending patent application entitled, RECEIVER MULTI-PROTOCOL INTERFACE AND APPLICATIONS THEREOF, Ser. No. 10/305,558, and having been filed on Nov. 27, 2002.

Figure 3:
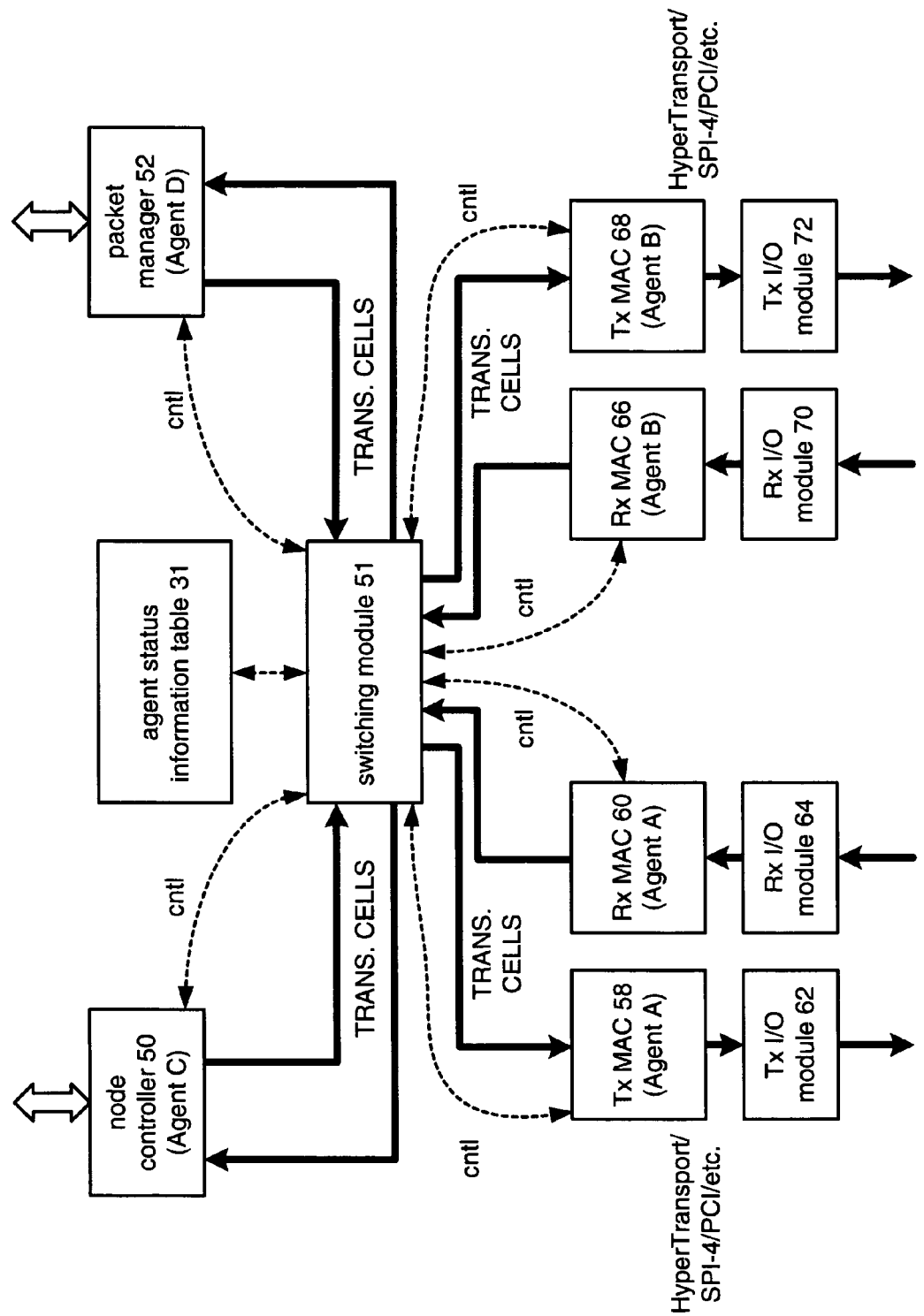
FIG. 3 is a schematic block diagram of the multiple processor device of FIG. 2 illustrating the flow of transaction cells between components thereof in accordance with the present invention.

FIG. 3 is a schematic block diagram of the multiple processor device of FIG. 2 illustrating the flow of transaction cells between components thereof in accordance with the present invention. The components of FIG. 3 are common to the components of FIG. 2 and will not be described further herein with respect to FIG. 3 except as to describe aspects of the present invention. Each component of the configurable interface, e.g., Tx MAC module 58, Rx MAC module 60, Rx MAC module 66, and Tx MAC module 68, is referred to as an agent within the processing device 20. Further, the node controller 50 and the packet manager 52 are also referred to as agents within the processing device 20. The agents A-D intercouple via the switching module 51. Data forwarded between the agents via the switching module 51 is carried within transaction cells, which will be described further with respect to FIGS. 4 and 5. The switching module 51 maintains an agent status information table 31, which will be described further with reference to FIG. 4.

The switching module 51 interfaces with the agents A-D via control information to determine the availability of data for transfer and resources for receipt of data by the agents. For example, in one operation an Rx MAC module 60 (Agent A) has data to transfer to packet manager 52 (Agent D). The data is organized in the form of transaction cells, as shown in FIG. 4. When the Rx MAC module 60 (Agent A) has enough data to form a transaction cell corresponding to a particular output virtual channel that is intended for the packet manager 52 (Agent D), the control information between Rx MAC module 60 (Agent A) and switching module 51 causes the switching module 51 to make an entry in the agent status information table 31 indicating the presence of such data for the output virtual channel. The packet manager 52 (Agent D) indicates to the switching module 51 that it has input resources that could store the transaction cell of the output virtual channel currently stored at Rx MAC module 60 (Agent A). The switching module 51 updates the agent status information table 31 accordingly.

When a resource match occurs that is recognized by the switching module 51, the switching module 51 schedules the transfer of the transaction cell from Rx MAC module 60 (Agent A) to packet manager 52 (Agent D). The transaction cells are of a common format independent of the type of data they carry. For example, the transaction cells can carry packets or portions of packets, input/output transaction data, cache coherency information, and other types of data. The transaction cell format is common to each of these types of data transfer and allows the switching module 51 to efficiently service any type of transaction using a common data format.

Referring now to FIG. 4, each transaction cell 402 includes a transaction cell control tag and transaction cell data. In the embodiment illustrated in FIG. 4, the transaction cell control tag is 4 bytes in size, whereas the transaction cell data is 16 bytes in size. Referring now to FIG. 5, the agent status information table 31 has an entry for each pair of source agent devices and destination agent devices, as well as control information indicating an end of packet (EOP) status. When a packet transaction is fully or partially contained in a transaction cell, that transaction cell may include an end of packet indicator. In such case, the source agent communicates via the control information with the switching module 51 to indicate that it has a transaction cell ready for transfer and that the transaction cell has contained therein an end of packet indication. Such indication would indicate that the transaction cell carries all or a portion of a packet. When it carries a portion of a packet, the transaction cell carries a last portion of the packet, including the end of packet.

The destination agent status contained within a particular record of the agent status information table 31 indicates the availability of resources in the particular destination agent to receive a transaction cell from a particular source agent. When a match occurs, in that a source agent has a transaction cell ready for transfer and the destination agent has resources to receive the transaction cell from the particular source agent, then a match occurs in the agent status information table 31 and the switching module 51 transfers the transaction cell from the source agent to the destination agent. After this transfer, the switching module 51 will change the status of the corresponding record of the agent status information table to indicate the transaction has been completed. No further transaction will be serviced between the particular source agent and the destination agent until the corresponding source agent has a transaction cell ready to transfer to the destination agent, at which time the switching module 51 will change the status of the particular record in the agent status information table to indicate the availability of the transaction cell for transfer. Likewise, when the destination agent has the availability to receive a transaction cell from the corresponding source agent, it will communicate with the switching module 51 to change the status of the corresponding record of the agent status information table 31.

Note that the TX MAC 58 and RX MAC 60 are jointly referred to as Agent A. Further, note that the TX MAC 68 and the RX MAC 66 are jointly referred to as Agent B. Such is the case because each TX MAC/RX MAC serves jointly as an input/output agent, as does the node controller 50 and the packet manager 52. In one particular example of transaction cell transfer, an incoming transaction cell formed by RX MAC 60 may have TX MAC 58 as a destination with the switching module 51 forwarding the transaction cell from the RX MAC 60 to the TX MAC 58.

FIG. 6 is a schematic block diagram of a portion of a Rx MAC module 60 or 66. The Rx MAC module 60 or 66 includes an elastic storage device 80, a decoder module 82, a reassembly buffer 84, a storage delay element 98, a receiver buffer 88, a routing module 86, and a memory controller 90. The decoder module 82 may include a HyperTransport (HT) decoder 82-1 and a system packet interface (SPI) decoder 82-2. In other embodiments the decoder module 82 may include a PCI decoder, a PCI Express decoder, or a PCI-X decoder, etc.

The elastic storage device 80 is operably coupled to receive a stream of data 92 from the receive I/O module 64 or 70. The received stream of data 92 includes a plurality of data segments (e.g., SEG1-SEG n). The data segments within the stream of data 92 correspond to control information and/or data from a plurality of virtual channels. The particular mapping of control information and data from virtual channels to produce the stream of data 92 will be discussed in greater detail with reference to FIG. 7. The elastic storage device 80, which may be a dual port SRAM, DRAM memory, register file set, or other type of memory device, stores the data segments 94 from the stream at a first data rate. For example, the data may be written into the elastic storage device 80 at a rate of 64 bits at a 400 MHz rate. The decoder module 82 reads the data segments 94 out of the elastic storage device 80 at a second data rate in predetermined data segment sizes (e.g., 8 or 16-byte segments).

The stream of data 92 is partitioned into segments for storage in the elastic storage device 80. The decoder module 82, upon retrieving data segments from the elastic storage device 80, decodes the data segments to produce decoded data segments (DDS) 96. The decoding may be done in accordance with the HyperTransport protocol via the HT decoder 82-1 or in accordance with the SPI protocol via the SPI decoder 82-2. Accordingly, the decoder module 82 is taking the segments of binary encoded data and decodes the data to begin the reassembly process of recapturing the originally transmitted data packets.

The reassembly buffer 84 stores the decoded data segments 96 in a first-in-first-out manner. In addition, if the corresponding decoded data segment 96 is less than the data path segment size (e.g., 8 bytes, 16 bytes, etc.), the reassembly buffer 84 pads the decoded data segment 96 with the data path segment size. In other words, if, for example, the data path segment size is 8 bytes and the particular decoded data segment 96 is 6 bytes, the reassembly buffer 84 will pad the decoded data segment 96 with 2 bytes of null information such that it is the same size as the corresponding data path segment. Further, the reassembly buffer 84 aligns the data segments to correspond with desired word boundaries. For example, assume that the desired word includes 16 bytes of information and the boundaries are byte 0 and byte 15. However, in a given time frame, the bytes that are received correspond to bytes 14 and 15 from one word and bytes 0-13 of another word. In the next time frame, the remaining two bytes (i.e., 14 and 15) are received along with the first 14 bytes of the next word. The reassembly buffer 84 aligns the received data segments such that full words are received in the given time frames (i.e., receive bytes 0-15 of the same word as opposed to bytes from two different words). Still further, the reassembly buffer 84 buffers the decoded data segments 96 to overcome inefficiencies in converting high-speed minimal bit data to slower-speed multiple bit data. Such functionality of the reassembly buffer ensures that the reassembly of data packets will be accurate.

The decoder module 82 may treat control information and data from virtual channels alike or differently. When the decoder module 82 treats the control information and data of the virtual channels similarly, the decoded data segments 96, which may include a portion of data from a virtual channel or control information, is stored in the reassembly buffer 84 in a first-in-first-out manner. Alternatively, the decoder module 82 may detect control information separately and provide the control information to the receiver buffer 88 thus bypassing the reassembly buffer 84. In this alternative embodiment, the decoder module 82 provides the data of the virtual channels to the reassembly buffer 84 and the control information to the receiver buffer 88.

The routing module 86 interprets the decoded data segments 96 as they are retrieved from the reassembly buffer 84. The routing module 86 interprets the data segments to determine which virtual channel they are associated with and/or for which piece of control information they are associated with. The resulting interpretation is provided to the memory controller 90, which, via read/write controls, causes the decoded data segments 96 to be stored in a location of the receiver buffer 88 allocated for the particular virtual channel or control information. The storage delay element 98 compensates for the processing time of the routing module 86 to determine the appropriate storage location within the receiver buffer 88.

The receiver buffer 88 may be a static random access memory (SRAM) or dynamic random access memory (DRAM) and may include one or more memory devices. In particular, the receiver buffer 88 may include a separate memory device for storing control information and a separate memory device for storing information from the virtual channels.

FIG. 6 further illustrates an example of the processing performed by the Rx MAC module 60 or 66. In the example, data segment 1 of the received stream of data 92 corresponds with control information CNTL 1. The elastic storage device 80 stores data segment 1, which, with respect to the Rx MAC module 60 or 66, is a set number of bytes of data (e.g., 8 bytes, 16 bytes, etc.). The decoder module 82 decodes data segment 1 to determine that data segment 1 corresponds to control information. The decoded data segment is then stored in the reassembly buffer 84 or provided to the receiver buffer 88. If the decoded control information segment is provided to the reassembly buffer 84, it is stored in a first-in-first-out manner. At some later time, the decoded control information segment is read from the reassembly buffer 84 by the routing module 86 and interpreted to determine that it is control information associated with a particular packet or particular control function. Based on this interpretation, the decoded data segment 1 is stored in a particular location of the receiver buffer 88.

Continuing with the example, the second data segment (SEG 2) corresponds to a first portion of data transmitted by virtual channel #1. This data is stored as binary information in the elastic storage device 80 as a fixed number of binary bits (e.g., 8 bytes, 16 bytes, etc.). The decoder module 82 decodes the binary bits to produce the decoded data segments 96, which, for this example, corresponds to DDS 2. When the decoded data segment (DDS 2) is read from the reassembly buffer 84, the routing module 86 interprets it to determine that it corresponds to a packet transmitted from virtual channel #1. Based on this interpretation, the portion of receiver buffer 88 corresponding to virtual channel #1 will be addressed via the memory controller 90 such that the decoded data segment #2 will be stored, as VC1_A in the receiver buffer 88. The remaining data segments illustrated in FIG. 6 are processed in a similar manner. Accordingly, by the time the data is stored in the receiver buffer 88, the stream of data 92 is decoded and segregated into control information and data information, where the data information is further segregated based on the virtual channels that transmitted it. As such, when the data is retrieved from the receiver buffer 88, it is in a generic format and partitioned based on the particular virtual channels that transmitted it.

Still referring to FIG. 6, a switching module interface 89 interfaces with the receiver buffer 88 and couples to the switching module 51. The receiver buffer 88 stores data on the basis of input virtual channels and/or output virtual channels. The receiver buffer 88 may only transmit data to the switching module 51 via the switching module interface 89 on the basis of output virtual channels. Thus, the agent status information table 31 is not updated to indicate the availability of output data until the receiver buffer 88 data is in the format of an output virtual channel and the data may be placed into a transaction cell for transfer to the switching module 51 via the switching module interface 89. The switching module interface 89 exchanges both data and control information with the switching module 51. In such case, the switching module 51 directs the switching module interface 89 to output transaction cells to the switching module 51. The switching module interface 89 extracts data from the receiver buffer 88 and forms the data into transaction cells that are transferred to the switching module 51.

The Tx MAC module 58 or 68 will have an equivalent, but inverted structure for the receipt of transaction cells from the switching module 51. In such case, a switching module interface of the Tx MAC module 58 or 68 will receive transaction cells from the switching module 51. Further, the switching module interfaces of the Tx MAC modules 58 and 68 will communicate control information to and from the switching module 51 to support the transfer of transaction cells.

Figure 7:
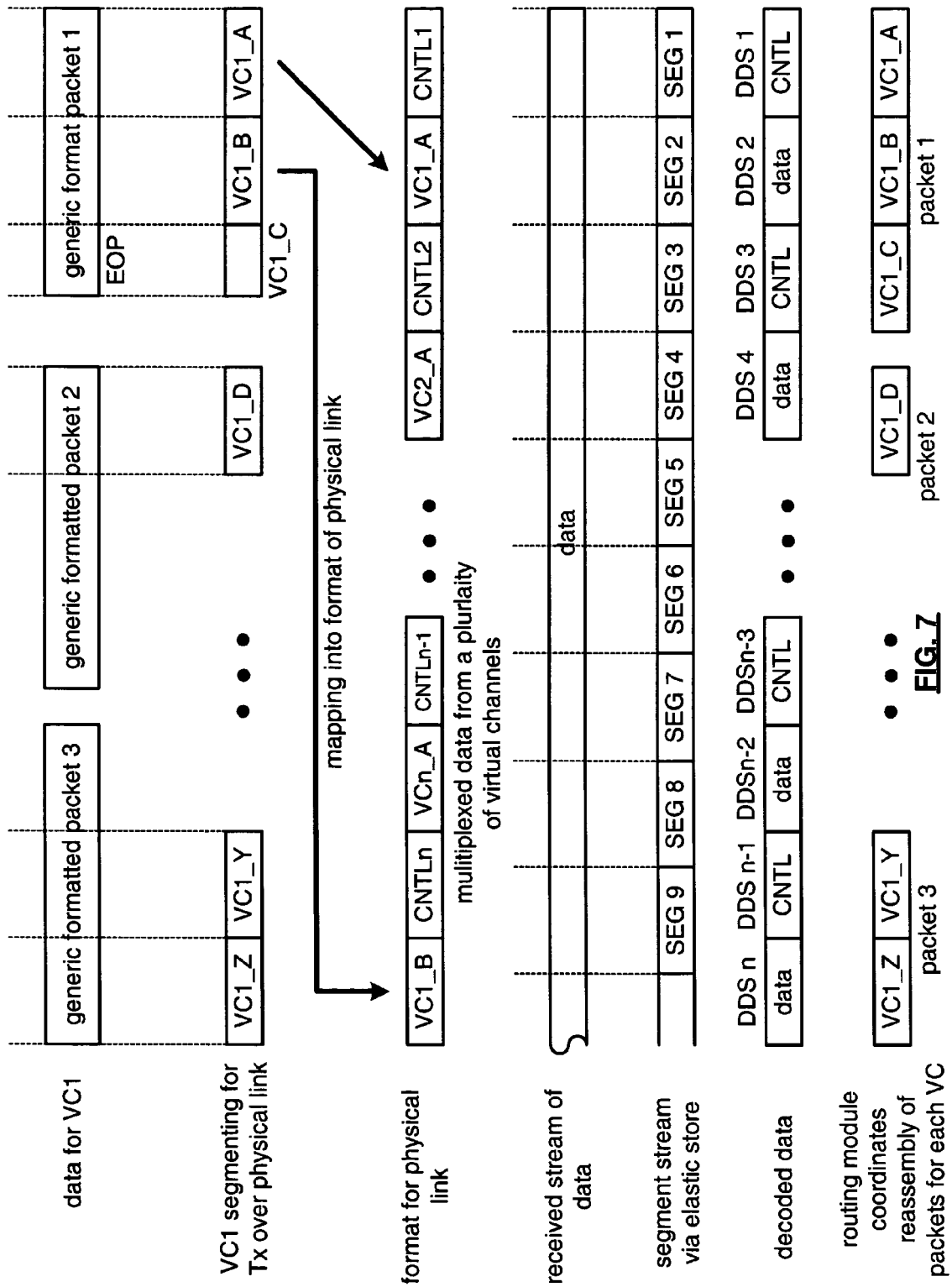
FIG. 7 is a graphical representation of the processing performed by a transmitter media access control module and a receiver media access control module in accordance with the present invention.

FIG. 7 is a graphical representation of the function of the Tx MAC module 58 or 68 and the Rx MAC module 60 or 66. The Tx MAC module 58 or 68 receives packets from a plurality of output virtual channels via the switching module 51. FIG. 7 illustrates the packets received by the Tx MAC module 58 or 68 from a first virtual channel (VC1). The data is shown in a generic format, which may correspond to ATM cells, frame relay packets, IP packets, TCP/IP packets, other types of packet switched formatting, and/or circuit switched formatting. The Tx MAC module 58 or 68 partitions the generically formatted packets into a plurality of data segments of a particular size. For example, the first data packet of virtual channel 1 is partitioned into three segments, VC1_A, VC1_B, and VC1_C. The particular size of the data segments corresponds with the desired data path size, which may be 8 bytes, 16 bytes, etc.

The first data segment for packet 1 (VC1_A) will include a start-of-packet indication for packet 1. The third data segment of packet 1 (VC1_C) will include an end-of-packet indication for packet 1. Since VC1_C corresponds to the last data segment of packet 1, it may be of a size less than the desired data segment size (e.g., of 8 bytes, 16 bytes, etc.). When this is the case, the data segment VC1_C will be padded and/or aligned via the reassembly buffer to be of the desired data segment size and aligned along word boundaries. Further note that each of the data segments may be referred to as data fragments. The segmenting of packets continues for the data produced via virtual channel 1 as shown. The Tx MAC module 58 or 68 then maps the data segments from the plurality of control virtual channels and control information into a particular format for transmission via the physical link. As shown, the data segments for virtual channel 1 are mapped into the format of the physical link, which provides a multiplexing of data segments from the plurality of virtual channels along with control information.

At the receiver side of the configurable interface 54 or 56, the transmitted data is received as a stream of data. As stated with respect to FIG. 6, the receiver section segments the stream of data and stores it via an elastic storage device. The decoder decodes the segments to determine control and data information. Based on the decoded information, the routing module 86 coordinates the reassembly of the packets for each of the virtual channels. As shown, the resulting data stored in the receiver buffer includes the data segments corresponding to packet 1, the data segments corresponding to packet 2, and the data segments corresponding to packet 3 for virtual channel 1.

The examples of FIGS. 5-7 are illustrative only to show the basic flow of data within the processing device 20. However, the transaction cell 402 aspects of the present invention may be employed with differing data flow formats and within differing types of systems. Thus, the illustrations and teachings of FIGS. 6-7 are not intended to limit the scope of the present invention.

Figure 8:
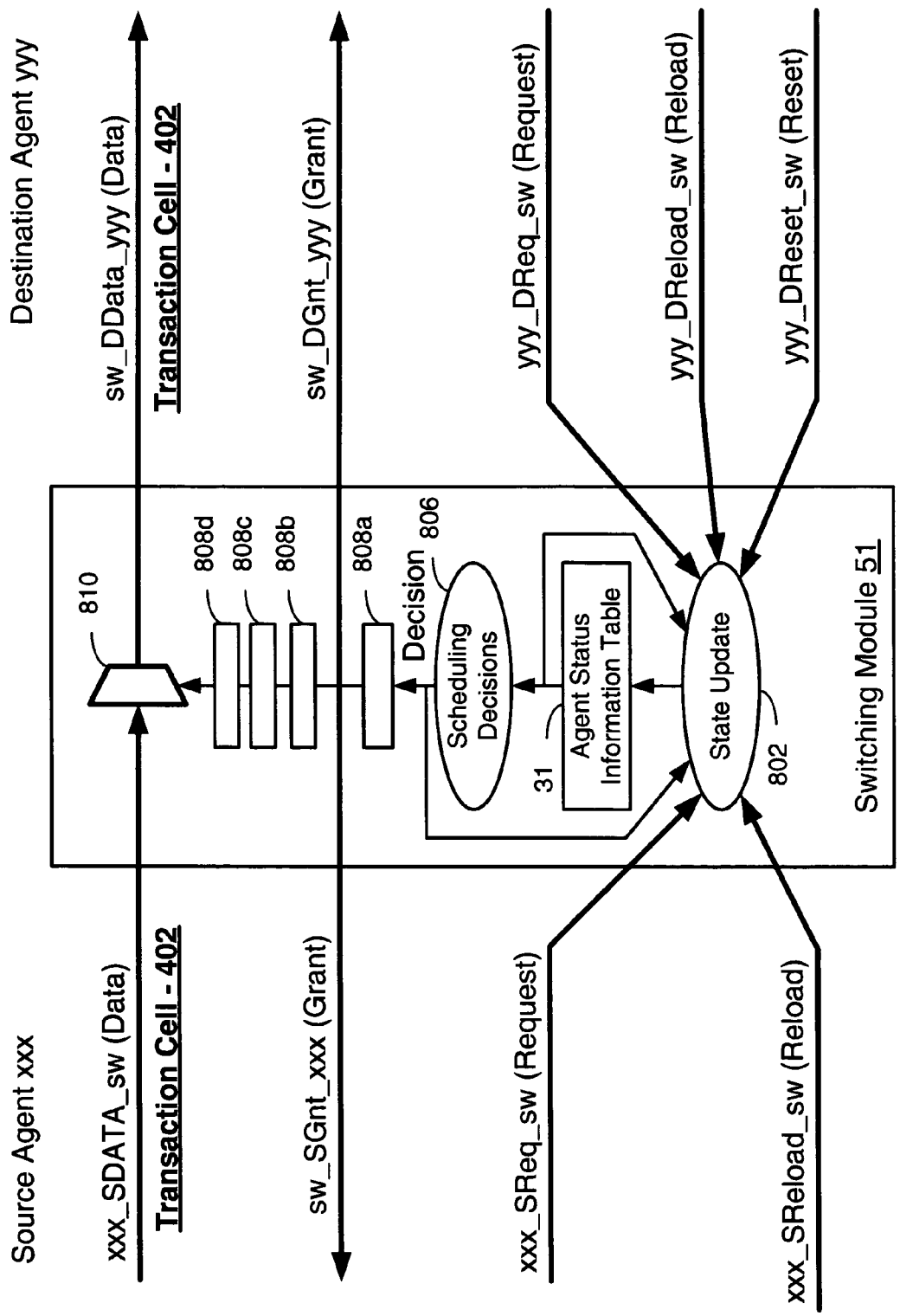
FIG. 8 is a block diagram illustrating operably the structure of the switching module and the manner in which control information is employed to service the exchange of transaction cells via the switching module.

FIG. 8 is a block diagram illustrating operably the structure of the switching module 51 and the manner in which control information is employed to service the exchange of transaction cells 402 via the switching module 51. A source agent, referred to as "Source Agent xxx" may be one of the Rx MAC 60, the Rx MAC 66, the node controller 50, or the packet manager 52 of FIG. 3. The destination agent, "Destination Agent yyy", may be the Tx MAC 58, the Tx MAC 68, the node controller 50, or the packet manager 52 of FIG. 3. The source agent has transaction cells 402 for transfer to the destination agent. The switching module 51 maintains the agent status information table 31 and exchanges control information with both the source agents and the destination agents. Control information received from the source agent by the switching module 51 includes request information (xxx_SReq_sw) and reload information (xxx_SReload_sw). Control information received by the switching module 51 from the destination agent includes request signals (yyy_DReq_sw) reload signals (yyy_DReload_sw), and reset signals (yyy_DRest_sw). Control information provided from the switching module 51 to the source agent includes grant information (sw_SGnt_xxx). Control information provided from the switching module 51 to the destination agent includes grant information grant signals (sw_DGnt_yy), The switching module 51 transfers transaction cells from the source agent to the destination agent. Thus, the transaction cells received by the switching module 51 from a source agent correspond to the transaction cells transmitted from the switching module 51 to the destination agent. Transaction cells 402 (Data) received from the source agent by the switching module 51 are referred to as xxx_SDATA_sw and transaction cells 402 provided to the destination agent by the switching module 51 are referred to as sw_DData_yyy.

The components of the switching module 51 include a state update portion, the agent status information table 31, scheduling decisions portion 806, and a plurality of delay elements 808*a*-808*d*. The switching module 51 also includes multiplexer 810 that forwards the transaction cells 402 from particular source agents to particular destination agents, based upon control input. In its operations, as are described further with reference to FIG. 14, the switching module 51 schedules and services the transfer of the transaction cells 402 between the source agent and the destination agent. Multiplexer 810 includes a plurality of multiplexing elements, each of which is capable of coupling any source agent to any destination agent in a given operation.

FIGS. 9 and 10 are tables illustrating switch interface signals employed by the switching module and a plurality of serviced agents. Referring to FIGS. 8, 9 and 10, the control information transferred from the source agent to the switching module 51 includes request information (xxx_SReq_sw) and the reload information (xxx_SReload_sw). The request information includes a destination agent identifier for which data is available, the type of data corresponding to the control information, the destination virtual channel or output virtual channel for which the data is available, an indicator as to whether the end-of-packet for that particular data contained in the transaction cell exists, and/or whether previous fields relating to the transaction cell are valid. Reload information that may be provided to the switching module 51 by the source agent includes an indication as to whether an end-of-packet of the reloaded destination/output virtual channel is present in the requested reloaded data and information concerning whether there is more data on the destination virtual channel that was just scheduled.

Control information received by the source agent from the switching module 51 includes grant information (sw_SGnt_xxx). The grant information is also shown in FIG. 9 and indicates to the source agent the identity of a destination agent to which data is to be sent, the type of data to be sent, the destination virtual channel (output virtual channel) for which data should be sent, and whether previous fields within the particular set of information requested in the transaction cell are valid. Based upon the grant, the source agent forms a transaction cell and when the transaction cell is delivered to the destination agent, the source agent will transfer the transaction cell. The format of the transaction cell includes the control tag and data.

As illustrated in FIG. 9, a data path from the source agent to the switching module 51 services transfer of transaction cells 402 that include a data portion and a control tag portion The transaction cell 402 illustrated includes a 16-byte data portion and a 4-byte control tag portion, which includes a count of four bits and a tag of 28 bits. Depending upon the type of data carried by the transaction cell, the contents of the data portion and control tag of the transaction cell will vary. The control tag includes a four-bit count field and a 28-bit tag portion. When the transaction cell carries packet data, the count bits indicate the number of bytes in the data field. In one particular nomenclature used, the value of 0 indicates that the data portion of the transaction cell carries 16 bytes. For non-response input/output transactions, the count bits are not used. However, for response input/output transactions, the count bits indicate the number of valid double words in the data portion of the transaction cell.

The 28 tag bits of the tag differs for differing traffic types. For packet traffic, the first four bits of the tag indicate the virtual channel corresponding to the transaction cell. Also included in the tag are four bits indicating the source of the packet transaction. When the packet transaction is carried on an HT fabric, the source identifier typically includes a port number of the source device coupled via the HT fabric. The tag may also indicate a next destination for HT-forwarding of the packet data transaction or an extended port ID for SPI-4 traffic forwarding. Also, the tag may include error bits of various types. One type of error bit may be set to indicate that an error was detected prior to the packet data transaction entering the servicing device. Another error bit may indicate that the servicing device, in this case an Rx MAC 60 or 66, discovered an error in the packet data transaction. The tag may also indicate that the whole packet data transaction must be dropped and ignored. This option is used for reset flushing operations.

For non-response input/output transactions, the tag bits include an indication of the type of command and/or whether the input/output transaction is a command. Also, the tag may include a flush bit to indicate that the input/output transaction is to be flushed. This is used during reset flushing, as well. When the input/output transaction carries a response, the tag includes information relating to the type of response and additional information concerning the response. Such tag information may also include a flush bit used for resource flushing. When the transaction cell corresponds to a packet data transaction, the tag relays differing information than when the transaction cell corresponds to an input/output transaction. When the transaction cell carries a portion of a packet data transaction, the transaction cell tag may include a transaction cell data bit count, an input virtual channel identifier, and a packet data source identifier.

Figure 11:
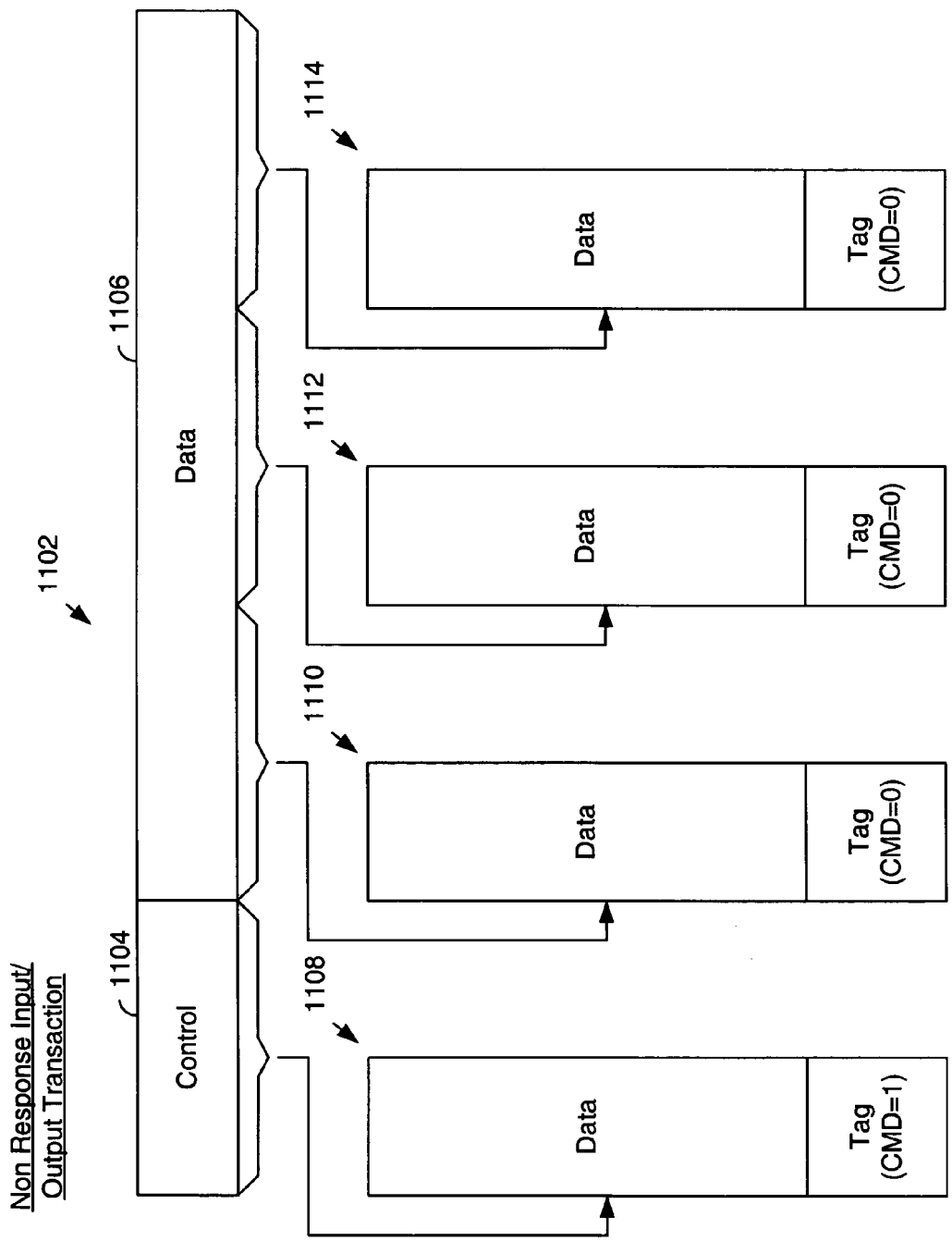
FIG. 11 is a block diagram illustrating one embodiment of the formation of transaction cells that carry non-response input/output transactions.

FIG. 11 is a block diagram illustrating one embodiment of the formation of transaction cells that carry non-response input/output transactions. Referring now to FIG. 11, the manner in which a non-response input/output transaction is contained within a plurality of transaction cells 402 is shown. The non-response input/output transaction 1102 includes a control portion 1104 and a data portion 1106. In an operation according to one embodiment of the present invention, the control portion 1104 is placed into a first transaction cell 1108. Transaction cells 1110, 1112, and 1114 carry the data portion 1106 of the non-response input/output transaction 1102. Stated more generally, each input/output transaction occupies a plurality of transaction cells with the control field 1104 of the non-response input/output transaction 1102 mapped to a first transaction cell and the data portion 1106 of the non-response input/output transaction 1102 mapped to transaction cells 1110, 1112, and 1114.

Figure 12:
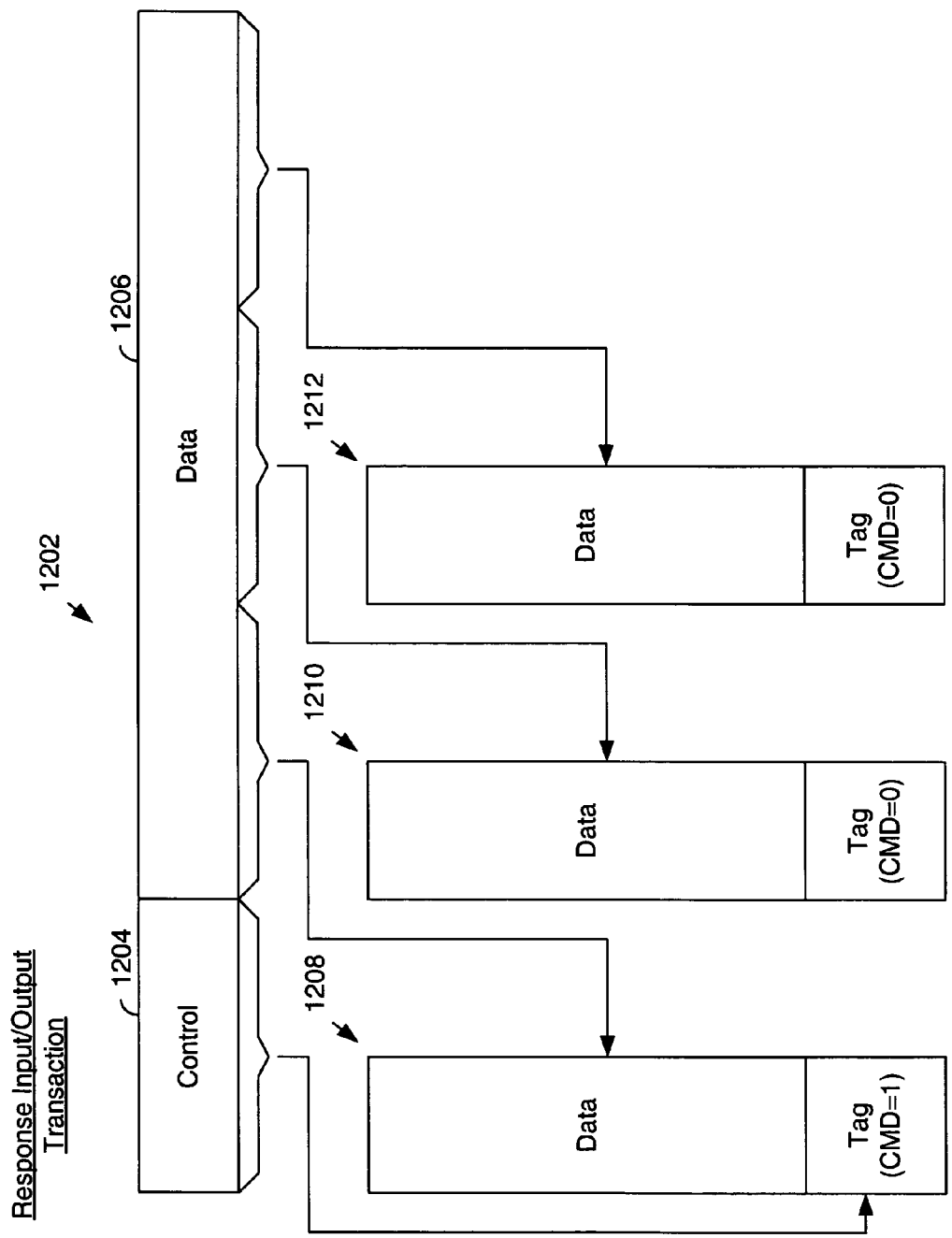
FIG. 12 is a block diagram illustrating one embodiment of the formation of transaction cells that carry response input/output transactions.

FIG. 12 is a block diagram illustrating one embodiment of the formation of transaction cells that carry response input/output transactions. As shown, a response input/output transaction 1202 includes a control portion 1204 and a data portion 1206. According to one aspect of the present invention, the control portion 1204 of the response input/output transaction 1202 is placed in a control tag portion of a first transaction cell 1208. Further, a first portion of the data portion 1206 of a response input/output transaction 1202 is placed into a data portion of transaction cell 1208. Second and third portions of the data portion 1206 of the response input/output transaction 1202 are placed into data portions of transaction cells 1210, and 1212, respectively. Thus, the manners in which non-response input/output transactions and response input/output transactions are mapped to transaction cells differ.

Figure 13:
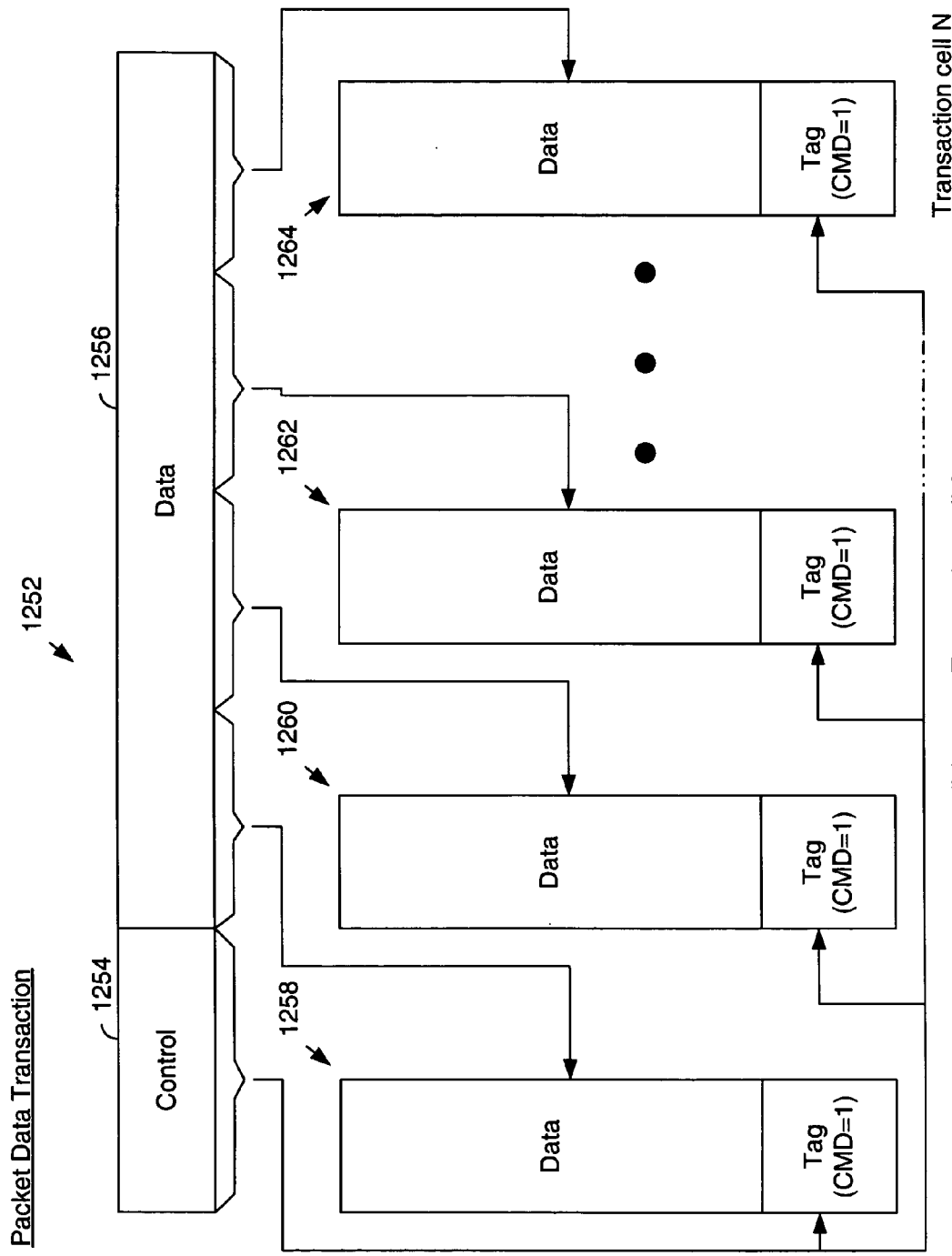
FIG. 13 is a block diagram illustrating one embodiment of the formation of transaction cells that carry packet data transactions.

FIG. 13 is a block diagram illustrating one embodiment of the formation of transaction cells that carry packet data transactions. As shown, a packet data transaction 1252 includes a control portion 1254 and a data portion 1256. The data portion 1256 is of variable length and may be very large compared to the size of response transactions 1202 and non-response transactions 1102. According to an aspect of the present invention, the control portion 1254 of the response input/output transaction 1252 is placed in a control tag portion of each of a plurality of transaction cells 1258-1264. A first portion of the data portion 1256 of the packet data transaction 1252 is placed into a data portion of transaction cell 1258. Second, third, fourth, . . . , $n^{th}$ portions of the data portion 1256 of the packet data transaction 1252 are placed into data portions of transaction cells 1260, 1262, . . . , 1264, respectively.

Figure 14:
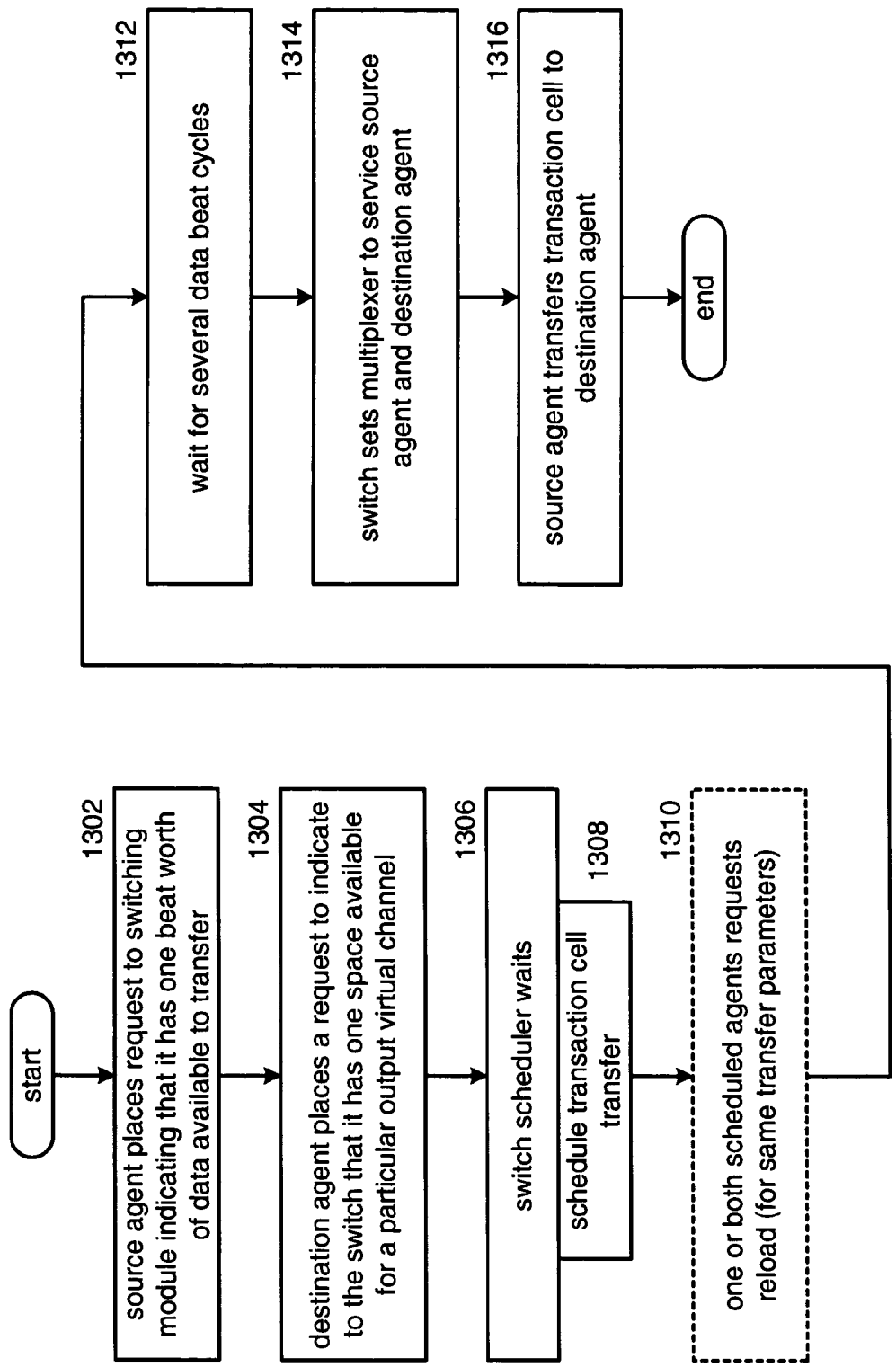
FIG. 14 is a flow chart illustrating operation of the switching module in servicing agents to transfer transaction cells between the agents.

FIG. 14 is a flow chart illustrating operation of the switching module in servicing agents to transfer transaction cells between the agents. Referring to both FIG. 14 and FIG. 8, in a first operation a source agent places a request to the switching module 51, indicating that it has one "beat" worth of data available to transfer to a particular destination agent (step 1302). The terminology of a "beat" refers to one transfer in which a particular transaction cell is transferred from a source agent to a destination agent. In the operation of FIG. 14, the source agent places a request to the switching module 51 using the request signals identified in FIG. 8. The request will include the destination agent, an Output Virtual Channel (OVC) identifier, an end-of-packet indication, and a valid signal. The switching module 51 is capable of servicing a plurality of source agent/destination agent/VC combinations each beat.

In a next operation, the destination agent places a request to indicate to the switch that it has one space available for a particular output virtual channel (step 1304). The destination agent places the request using the request signals illustrated in FIG. 8. Because the switching module 51 can service only one outstanding request per destination OVC, the destination agent cannot make another request for the same OVC until the prior request is scheduled. With these two operations complete, the switching module state update portion 802 waits until a particular opportunity arises to schedule the transaction (at step 1306). The switching module 51 makes scheduling decisions via the scheduling decisions portion 806. With this decision made, a decision is output to the source agent and the destination agent via the grant control signal interfaces (step 1308). Optionally, at step 1310, after the grant is made, one or both of the source agent or the destination agent may request a reload relating to the same transfer parameters.

Then, based upon the number of delay cycle blocks 808A-808D, the source agent and destination agent wait for the particular number of data beat cycles (step 1312). Finally, when the scheduled transaction reaches the particular data beat cycle, the switching module 51 sets the multiplexer 810 to select the particular source agent and destination agent combination (step 1314). The source agent then transfers the transaction cell to the destination agent (step 1316).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A system for servicing packet data transactions and input/output transactions within a processing device using common data paths, the system comprising:
an input port that is operable to receive communications from a communicatively coupled processing device, the communications including packet data transactions and input/output transactions;
an output port that is operable to transmit communications to a communicatively coupled processing device, the communications including packet data transactions and input/output transactions;
a node controller communicatively coupled to a system bus of the processing device that is operable to service input/output transactions;
a packet manager communicatively coupled to the system bus of the processing device that is operable to service packet data transactions; and
a switching module communicatively coupled to the input port, the output port, the node controller, and the packet manager, wherein the switching module is operable to service the exchange of transaction cells among the input port, the output port, the node controller, and the packet manager, each transaction cell having a control tag and data and carrying all or a portion of a packet data transaction or an input/output transaction.

2. The system of claim 1, further comprising an agent status information table used by the switching module to schedule the exchange of transaction cells among the input port, the output port, the node controller, and the packet manager.

3. The system of claim 1, wherein the input port and/or the output port support both a packet based interface and an address based interface.

4. The system of claim 3, wherein:
the packet based interface is a SPI-4 interface; and
the address based interface is one of a HyperTransport interface, a PCI interface, a PCI-X interface, or a PCI Express interface.

5. The system of claim 1, wherein the input/output transactions comprise read transactions, write transactions, cache coherency transactions, and responses.

6. The system of claim 1, wherein the packet data transactions comprise packet data transfers between the processing device and another processing device coupled to the processing device via the input port and/or the output port.

7. The system of claim 1, further comprising
at least one additional input port communicatively coupled to the switching module;
at least one additional output port communicatively coupled to the switching module; and
wherein the switching module communicates with the at least one additional input port and the at least one additional output port using transactions cells.

8. The system of claim 1, wherein the control tag comprises:
a first set of information when the transaction cell corresponds to a packet data transaction; and
a second set of information when the transaction cell corresponds to an input/output transaction.

9. The system of claim 1, wherein when a transaction cell corresponds to a packet data transaction the control tag comprises:
a transaction cell data bit count;
an input virtual channel identifier; and
a packet data source identifier.

10. The system of claim 1, wherein when a transaction cell corresponds an input/output transaction the control tag comprises:
a first set of information when the transaction cell corresponds to non-response input/output transaction; and
a second set of information when the transaction cell corresponds to a response input/output transaction.

11. The system of claim 10, wherein:
the first set of information includes a command bit and a flush bit; and
the second set of information includes a command bit, information concerning forwarding of the input/output transaction, and a flush bit.

12. The system of claim 1, wherein:
a response input/output transaction occupies a single transaction cell;
a control tag of the single transaction cell carries a control portion of the response input/output transaction; and
data of the single transaction cell carries a data portion of the response input/output transaction.

13. The system of claim 1, wherein:
each input/output transaction occupies a plurality of transaction cells;
when the input/output transaction is a response, a control tag of a first transaction cell carries a control portion of the input/output transaction and data of the first transaction cell carries a data portion of the input/output transaction; and
when the input/output transaction is not a response, data of a first transaction cell carries a control portion of the input/output transaction and data of a second transaction cell carries a data portion of the input/output transaction.

14. The system of claim 1, wherein:
a control field of non-response input/output transaction is mapped to a first transaction cell; and
a data field of the non-response input/output transaction is mapped to at least one of $2^{nd}$-$5^{th}$ transaction cells.

15. The system of claim 14, wherein:
a control field of response input/output transaction is mapped to a control tag of a first transaction cell; and
a data field of the response input/output transaction is mapped to data of the first transaction cell and to data of at least one of $1^{st}$-$4^{th}$ transaction cells.

16. The system of claim 1, wherein:
the packet data transaction occupies a plurality of transaction cells; and
a control tag of each transaction cell of the plurality of transaction cells carries a control portion of the packet data transaction.

17. The system of claim 1, wherein the switching module supports the multicasting of transaction cells between the input port, the output port, the node controller, and the packet manager.

18. A method for servicing packet data transactions and input/output transactions within a processing device using a common data path, the method comprising:
receiving communications from a communicatively coupled processing device at an input port, the communications including packet data transactions and input/output transactions;
transmitting communications to a communicatively coupled processing device from an output port, the communications including packet data transactions and input/output transactions;

servicing input/output transactions using a node controller;

servicing packet data transactions using a packet manager;

forming transaction cells at the input port, the node controller, and the packet managers, each transaction cell having a control tag and data and carrying all or a portion of a packet data transaction or an input/output transaction; and passing transaction cells between the input port, the output port, the node controller, and the packet managers on the common data path.

19. The method of claim 18, further comprising scheduling the exchange of transaction cells among the input port, the output port, the node controller, and the packet manager based upon the management of control information.

20. The method of claim 18, further comprising supporting both a packet-based interface and an input/output-based interface at the input port and the output port.

21. The method of claim 20, wherein:
the packet-based interface is a SPI-4 interface; and
the input/output-based interface is one of a HyperTransport interface, a PCI interface, a PCI-X interface, or a PCI Express interface.

22. The method of claim 18, wherein the input/output transactions comprise read transactions, write transactions, and cache coherency transactions.

23. The method of claim 18, wherein the packet data transactions comprise packet data transfers between the processing device and another processing device coupled to the processing device via the input port and/or the output port.

24. The method of claim 18, wherein the control tag comprises:
a first set of information when the transaction cell corresponds to a packet data transaction; and
a second set of information when the transaction cell corresponds to an input/output transaction.

25. The method of claim 18, wherein when a transaction cell corresponds to a packet data transaction the control tag comprises:
a transaction cell data bit count;
an input virtual channel identifier; and
a packet data source identifier.

26. The method of claim 18, wherein when a transaction cell corresponds an input/output transaction the control tag comprises:
a first set of information when the transaction cell corresponds to non-response input/output transaction; and
a second set of information when the transaction cell corresponds to a response input/output transaction.

27. The method of claim 26, wherein:
the first set of information includes a command bit and a flush bit; and
the second set of information includes a command bit, information concerning forwarding of the input/output transaction, and a flush bit.

28. The method of claim 18, further comprising forming a transaction cell to carry a non-response input/output transaction by:
placing a control field of the non-response input/output transaction in a data portion of a first transaction cell; and
placing a data field of the non-response input/output transaction in data portions of subsequent transaction cells.

29. The method of claim 18, further comprising forming a transaction cell to carry a response input/output transaction by:
placing a control portion of the response input/output transaction into a control tag of a single transaction cell; and
placing a data field of the response input/output transaction into a data portion of the input/output transaction.

30. The method of claim 18, further comprising forming a transaction cell to carry response input/output transactions by:
placing a control field of the response input/output transaction in a control tag of a first transaction cell; and
placing a data field of the response input/output transaction in data portions of the first transaction cell and subsequent transaction cells.

31. The method of claim 18, further comprising multicasting transaction cells between the input port, the output port, the node controller, and the packet manager.

* * * * *